United States Patent [19]
Flores et al.

[11] Patent Number: 5,907,385
[45] Date of Patent: May 25, 1999

[54] NOSE PAD AND EAR PAD HAVING TWO SURFACES ADHESIVE

[76] Inventors: Jesse P. Flores; Lita Flores, both of 10151 Lyndale Ave., San Jose, Calif. 95127

[21] Appl. No.: 09/133,457

[22] Filed: Aug. 13, 1998

[51] Int. Cl.⁶ .............................. G02C 5/14; G02C 5/12
[52] U.S. Cl. .......................... 351/139; 351/111; 351/122; 351/136; 351/138
[58] Field of Search ................................. 351/139, 138, 351/137, 136, 41, 122, 111, 123

[56] References Cited

U.S. PATENT DOCUMENTS

| | | | |
|---|---|---|---|
| 3,283,888 | 11/1966 | Scott | 351/139 |
| 4,070,104 | 1/1978 | Rice | 351/138 |
| 4,165,925 | 8/1979 | Donovan | 351/138 |
| 5,092,666 | 3/1992 | Cress | 351/136 |
| 5,196,871 | 3/1993 | Tom | 351/139 |

*Primary Examiner*—Hung Xuan Dang

[57] ABSTRACT

A new adhesive pad set for attachment to eyeglasses to help hold the eyeglasses to the face of a wearer. The inventive device includes a pair of nose pads adapted for attaching to the nose tabs of a pair of eyeglasses and a pair of ear pads adapted for attaching to the end pieces of the temples of the frame of a pair of eyeglasses. Each nose pad has a first and second surfaces, a pair of ends and a pair of sides extending between the ends of the nose pad. An adhesive is provided on the first and second surfaces of each nose pad. The adhesive on the second surface is designed for adhesively attaching the second surface to a nose tab of a pair of glasses. The adhesive on the first surface is designed for adhesively attaching the first surface to the nose of a wearer to help hold the eyeglasses on the nose of the wearer. Each ear pad has a first and second surfaces, a pair of ends and a pair of sides extending between the ends of the ear pad. An adhesive is provided on the first and second surfaces of each ear pad. The adhesive on the second surface is designed for adhesively attaching the second surface to an end piece of a temple of a frame of a pair of glasses. The adhesive on the first surface is designed for adhesively attaching the first surface to the ear of a wearer to help hold the eyeglasses on the ear of the wearer.

11 Claims, 2 Drawing Sheets

NOSE PAD AND EAR PAD HAVING TWO SURFACES ADHESIVE

BACKGROUND OF THE INVENTION

1. Field of the Invention

The present invention relates to pads for eyeglasses and more particularly pertains to a new adhesive pad set for attachment to eyeglasses to help hold the eyeglasses to the face of a wearer.

2. Description of the Prior Art

The use of pads for eyeglasses is known in the prior art. More specifically, pads for eyeglasses heretofore devised and utilized are known to consist basically of familiar, expected and obvious structural configurations, notwithstanding the myriad of designs encompassed by the crowded prior art which have been developed for the fulfillment of countless objectives and requirements.

Known prior art pads for eyeglasses include U.S. Pat. Nos. 5,196,871; 3,186,001; 4,657,364; 3,233,956; 4,070,104; and U.S. Pat. No. Des. 311,196.

While these devices fulfill their respective, particular objectives and requirements, the aforementioned patents do not disclose a new adhesive pad set. The inventive device includes a pair of nose pads adapted for attaching to the nose tabs of a pair of eyeglasses and a pair of ear pads adapted for attaching to the end pieces of the temples of the frame of a pair of eyeglasses. Each nose pad has a first and second surfaces, a pair of ends and a pair of sides extending between the ends of the nose pad. An adhesive is provided on the first and second surfaces of each nose pad. The adhesive on the second surface is designed for adhesively attaching the second surface to a nose tab of a pair of glasses. The adhesive on the first surface is designed for adhesively attaching the first surface to the nose of a wearer to help hold the eyeglasses on the nose of the wearer. Each ear pad has a first and second surfaces, a pair of ends and a pair of sides extending between the ends of the ear pad. An adhesive is provided on the first and second surfaces of each ear pad. The adhesive on the second surface is designed for adhesively attaching the second surface to an end piece of a temple of a frame of a pair of glasses. The adhesive on the first surface is designed for adhesively attaching the first surface to the ear of a wearer to help hold the eyeglasses on the ear of the wearer.

In these respects, the adhesive pad set according to the present invention substantially departs from the conventional concepts and designs of the prior art, and in so doing provides an apparatus primarily developed for the purpose of attachment to eyeglasses to help hold the eyeglasses to the face of a wearer.

SUMMARY OF THE INVENTION

In view of the foregoing disadvantages inherent in the known types of pads for eyeglasses now present in the prior art, the present invention provides a new adhesive pad set construction wherein the same can be utilized for attachment to eyeglasses to help hold the eyeglasses to the face of a wearer.

The general purpose of the present invention, which will be described subsequently in greater detail, is to provide a new adhesive pad set apparatus and method which has many of the advantages of the pads for eyeglasses mentioned heretofore and many novel features that result in a new adhesive pad set which is not anticipated, rendered obvious, suggested, or even implied by any of the prior art pads for eyeglasses, either alone or in any combination thereof.

To attain this, the present invention generally comprises a pair of nose pads adapted for attaching to the nose tabs of a pair of eyeglasses and a pair of ear pads adapted for attaching to the end pieces of the temples of the frame of a pair of eyeglasses. Each nose pad has a first and second surfaces, a pair of ends and a pair of sides extending between the ends of the nose pad. An adhesive is provided on the first and second surfaces of each nose pad. The adhesive on the second surface is designed for adhesively attaching the second surface to a nose tab of a pair of glasses. The adhesive on the first surface is designed for adhesively attaching the first surface to the nose of a wearer to help hold the eyeglasses on the nose of the wearer. Each ear pad has a first and second surfaces, a pair of ends and a pair of sides extending between the ends of the ear pad. An adhesive is provided on the first and second surfaces of each ear pad. The adhesive on the second surface is designed for adhesively attaching the second surface to an end piece of a temple of a frame of a pair of glasses. The adhesive on the first surface is designed for adhesively attaching the first surface to the ear of a wearer to help hold the eyeglasses on the ear of the wearer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adhesive pad set apparatus and method which has many of the advantages of the pads for eyeglasses mentioned heretofore and many novel features that result in a new adhesive pad set which is not anticipated, rendered obvious, suggested, or even implied by any of the prior art pads for eyeglasses, either alone or in any combination thereof.

It is another object of the present invention to provide a new adhesive pad set which may be easily and efficiently manufactured and marketed.

It is a further object of the present invention to provide a new adhesive pad set which is of a durable and reliable construction.

An even further object of the present invention is to provide a new adhesive pad set which is susceptible of a low cost of manufacture with regard to both materials and labor, and which accordingly is then susceptible of low prices of sale to the consuming public, thereby making such adhesive pad set economically available to the buying public.

Still yet another object of the present invention is to provide a new adhesive pad set which provides in the apparatuses and methods of the prior art some of the advantages thereof, while simultaneously overcoming some of the disadvantages normally associated therewith.

Still another object of the present invention is to provide a new adhesive pad set for attachment to eyeglasses to help hold the eyeglasses to the face of a wearer.

Yet another object of the present invention is to provide a new adhesive pad set which includes a pair of nose pads adapted for attaching to the nose tabs of a pair of eyeglasses and a pair of ear pads adapted for attaching to the end pieces of the temples of the frame of a pair of eyeglasses. Each nose pad has a first and second surfaces, a pair of ends and a pair of sides extending between the ends of the nose pad. An adhesive is provided on the first and second surfaces of each nose pad. The adhesive on the second surface is designed for adhesively attaching the second surface to a nose tab of a pair of glasses. The adhesive on the first surface is designed for adhesively attaching the first surface to the nose of a wearer to help hold the eyeglasses on the nose of the wearer. Each ear pad has a first and second surfaces, a pair of ends and a pair of sides extending between the ends of the ear pad. An adhesive is provided on the first and second surfaces of each ear pad. The adhesive on the second surface is designed for adhesively attaching the second surface to an end piece of a temple of a frame of a pair of glasses. The adhesive on the first surface is designed for adhesively attaching the first surface to the ear of a wearer to help hold the eyeglasses on the ear of the wearer.

Still yet another object of the present invention is to provide a new adhesive pad set that stops eyeglasses from sliding off the nose of a wearer.

Even still another object of the present invention is to provide a new adhesive pad set that allows a wearer to lean and bend forwards without having to fear that their eyeglasses will fall off of their face.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
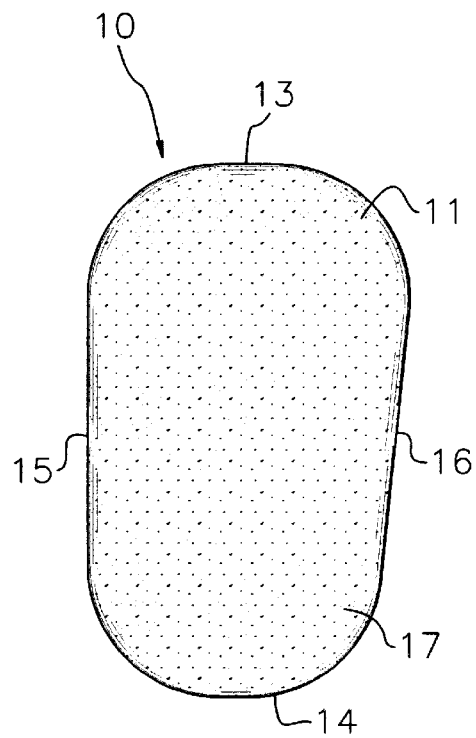
FIG. 1 is a schematic side view of the first surface of a nose pad of a new adhesive pad set according to the present invention.
Figure 2:
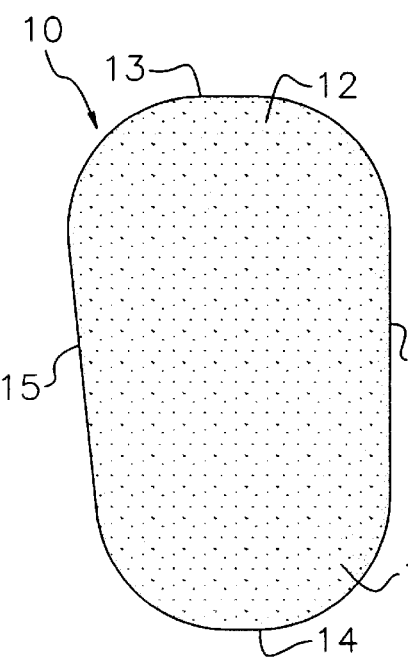
FIG. 2 is a schematic side view of the second surface of a nose pad of the present invention.

With reference now to the drawings, and in particular to FIGS. 1 through 8 thereof, a new adhesive pad set embodying the principles and concepts of the present invention will be described.

In use, the set of pads is designed for attachment to a pair of eyeglasses 1 having a front frame 2 for holding pair of lenses, a bridge 3, and a pair of temples extending from the front frame 2. The front frame 2 has a pair of nose tabs 5 for resting on a nose of a wearer. The nose tabs 5 are located adjacent the bridge 3. Each of the temples 4 has an end piece 6 for resting on and looping behind the ears of a wearer. As best illustrated in FIGS. 1 through 8, the adhesive pad set generally comprises a pair of nose pads 10 adapted for attaching to the nose tabs 5 of a pair of eyeglasses 1 and a pair of ear pads 20 adapted for attaching to the end pieces 6 of the temples of the frame 2 of a pair of eyeglasses 1. Each nose pad 10 has a first and second surfaces 11,12, a pair of ends 13,14 and a pair of sides 15,16 extending between the ends 13,14 of the nose pad 10. An adhesive 17 is provided on the first and second surfaces 11,12 of each nose pad 10. The adhesive on the second surface 12 is designed for adhesively attaching the second surface 12 to a nose tab 5 of a pair of glasses 1. The adhesive on the first surface 11 is designed for adhesively attaching the first surface 11 to the nose of a wearer to help hold the eyeglasses 1 on the nose of the wearer. Each ear pad 20 has a first and second surfaces 21,22, a pair of ends 23,24 and a pair of sides 25,26 extending between the ends 23,24 of the ear pad 20. An adhesive 27 is provided on the first and second surfaces 23,24 of each ear pad 20. The adhesive on the second surface 24 is designed for adhesively attaching the second surface 24 to an end piece 6 of a temple 4 of a frame 2 of a pair of glasses 1. The adhesive on the first surface 23 is designed for adhesively attaching the first surface 23 to the ear of a wearer to help hold the eyeglasses 1 on the ear of the wearer.

Figure 3:
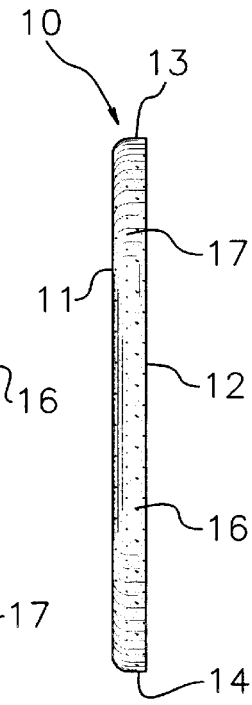
FIG. 3 is a schematic side view of a side of a nose pad of the present invention.
Figure 7:
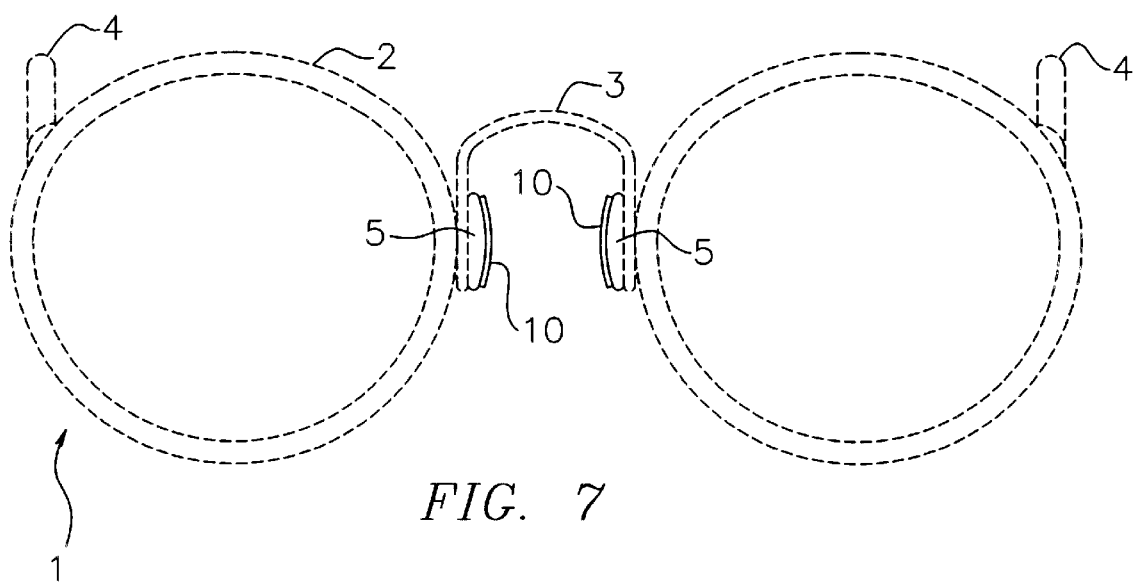
FIG. 7 is a schematic side view of nose pads of the present invention attached to the nose tabs of a pair of eyeglasses.
Figure 8:
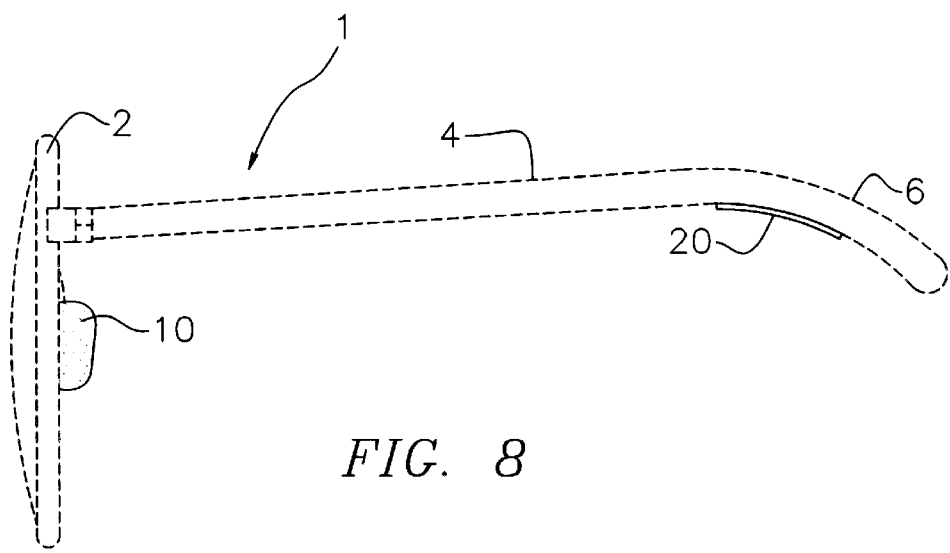
FIG. 8 is a schematic side view of a nose pad and an ear pad of the present invention attached to a pair of eyeglasses.

In closer detail, the set of pads includes a pair of nose pads 10 adapted for attaching to the nose tabs 5 of a pair of eyeglasses 1. Each nose pad 10 is generally oblong and has a first and second surfaces 21,22, a pair of ends 13,14 and a pair of sides 15,16 extending between the ends 13,14 of the nose pad 10. Preferably, the sides 15,16 of each nose pad 10 converge towards one another in a direction towards one of the ends 14 of the nose pad 10 such that the nose pad 10 is tapered toward that end 14 of the nose pad 10. As illustrated in FIG. 3, preferably the ends 13,14 and sides 15,16 of each nose pad 10 are rounded towards the first surface 11 of the nose pad 10. In the preferred embodiment, each corner of each nose pad formed at each intersection of an end and a side of a nose pad 10 are rounded. Each nose pad 10 has a length defined between the ends 13,14, a width is defined between the sides 15,16 of the of the nose pad 10 (as measured at the longer of the two ends 13), and a thickness defined between the first and second surfaces 11,12. Preferably, the length of each nose pad 10 is greater than about ½ inch, the width of each nose pad 10 is greater than about ½ inch, and the thickness of each nose pad 10 is greater than about 1/32 inch. Ideally, the length of each nose pad 10 is greater than about ¾ inch, the width of each nose pad 10 is greater than about ⅝ inch, and the thickness of each nose pad 10 is greater than about 1/16 inch. An adhesive 17 is provided on the first and second surfaces 11,12 of each nose pad 10. Preferably, the adhesive 17 substantially covers each nose pad 10. As illustrated in FIGS. 7 and 8, the adhesive 17 on the second surface 12 is designed for adhesively attaching the second surface 12 to a nose tab 5 of a pair of glasses 1. The adhesive 17 on the first surface 11 is designed for adhesively attaching the first surface 11 to the nose of a wearer to help hold the eyeglasses 1 on the nose of the wearer.

Figure 4:
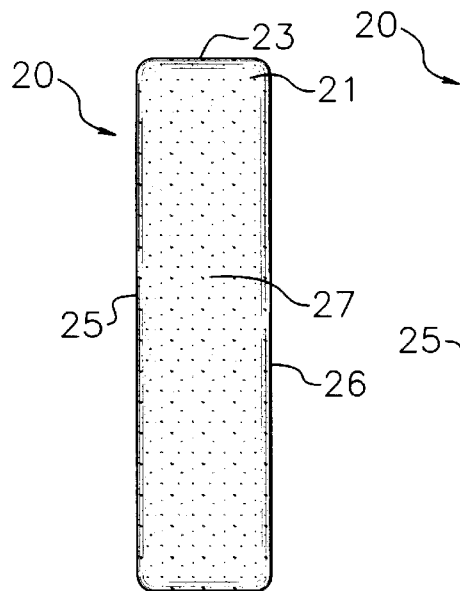
FIG. 4 is a schematic side view of the first surface of an ear pad of the present invention.
Figure 5:
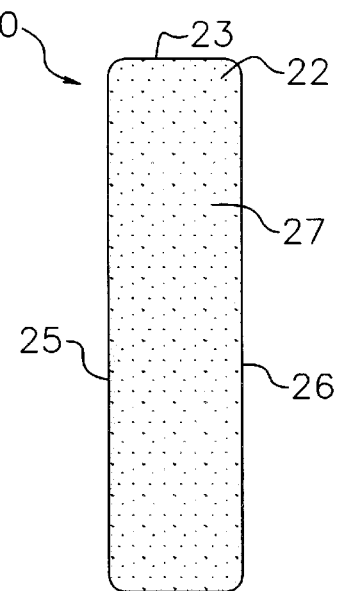
FIG. 5 is a schematic side view of the second surface of an ear pad of the present invention.
Figure 6:
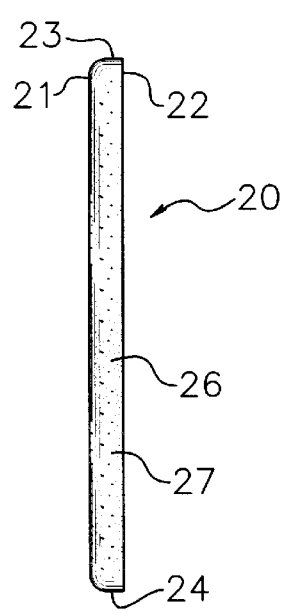
FIG. 6 is a schematic side view of a side of an ear pad of the present invention.

With reference to FIGS. 4, 5, and 6, the set of pads also includes a pair of ear pads 20 adapted for attaching to the bottom of the end pieces 6 of the temples of the frame 2 of a pair of eyeglasses 1. Each ear pad 20 is generally rectangular and has a first and second surfaces 21,22, a pair of ends 23,24 and a pair of sides 25,26 extending between the ends 23,24 of the ear pad 20. As illustrated in FIG. 6, preferably the ends 23,24 and sides 25,26 of each ear pad 20 are rounded towards the first surface 21 of the ear pad 20. Each ear pad 20 has a plurality of corners, with each corner being formed at each intersection of a end and a side of a ear pad 20. Like the nose pads 10, preferably the corners of the ear pads 20 are also rounded. Each ear pad 20 has a length defined between the ends 23,24, a width is defined between the sides 25,26, and a thickness defined between the first and second surfaces 21,22. Preferably, the length of each ear pad 20 is greater than about ⅜ inch, the width of each ear pad 20 is greater than about ¼ inch, and the thickness of each ear pad 20 is greater than about 1/32 inch. Ideally, the length of each ear pad 20 is greater than about ¾ inch, the width of each ear pad 20 is greater than about ½ inch, and the thickness of each ear pad 20 is greater than about 1/16 inch. An adhesive 27 is provided on the first and second surfaces 21,22 of each ear pad 20. Preferably, the adhesive 27 substantially covers each ear pad 20. The adhesive 27 on the second surface 22 is designed for adhesively attaching the second surface 22 to the bottom of an end piece 6 of a temple 4 of a frame 2 of a pair of glasses. The adhesive 27 on the first surface 21 is designed for adhesively attaching the first surface 21 to the back of a wearer to help hold the eyeglasses 1 on the ear of the wearer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A set of pads for attachment to a pair of eyeglasses having a front frame for holding pair of lenses, a bridge, and a pair of temples extending from the front frame, the front frame having a pair of nose tabs for resting on a nose of a wearer, the nose tabs being located adjacent the bridge, each of the temples having an end piece for resting on and looping behind the ears of a wearer, said set of pads comprising:

a pair of nose pads adapted for attaching to the nose tabs of a pair of eyeglasses;

each nose pad having a first and second surfaces, a pair of ends and a pair of sides extending between said ends of said nose pad;

an adhesive being provided on said first and second surfaces of each nose, said adhesive on said second surface being for adhesively attaching said second surface to a nose tab of a pair of glasses, said adhesive on said first surface being for adhesively attaching said first surface to the nose of a wearer to help hold the eyeglasses on the nose of the wearer;

a pair of ear pads adapted for attaching to the end pieces of the temples of the frame of a pair of eyeglasses;

each ear pad having a first and second surfaces, a pair of ends and a pair of sides extending between said ends of said ear pad; and an adhesive being provided on said first and second surfaces of each ear pad, said adhesive on said second surface being for adhesively attaching said second surface to an end piece of a temple of a frame of a pair of glasses, said adhesive on said first surface being for adhesively attaching said first surface to the ear of a wearer to help hold the eyeglasses on the ear of the wearer.

2. The set of pads of claim 1, wherein each nose pad is generally oblong, and wherein each ear pad is generally rectangular.

3. The set of pads of claim 1, wherein said sides of each nose pad converge towards one another in a direction towards one of said ends of said nose pad.

4. The set of pads of claim 1, wherein said ends and sides of each nose pad are rounded towards said first surface of said nose pad, and wherein said ends and sides of each ear pad are rounded towards said first surface of said ear pad.

5. The set of pads of claim 1, wherein each nose pad has a plurality of corners, a corner being formed at each intersection of a end and a side of a nose pad, said corners being rounded, and wherein each ear pad has a plurality of corners, a corner being formed at each intersection of a end and a side of a ear pad, said corners being rounded.

6. The set of pads of claim 1, wherein each nose pad has a length defined between said ends of said nose pad, each nose pad has a width being defined between said sides of said of said nose pad, wherein each nose pad having a thickness defined between said first and second surfaces of said nose pad, wherein said length of each nose pad is greater than about ½ inch, wherein said width of each nose pad is greater than about ½ inch, and wherein said thickness of each nose pad is greater than about 1/32 inch.

7. The set of pads of claim 6, wherein said length of each nose pad is greater than about ¾ inch, wherein said width of each nose pad is greater than about ⅝ inch, and wherein said thickness of each nose pad is greater than about 1/16 inch.

8. The set of pads of claim 1, wherein said adhesive substantially covers each nose pad, and wherein said adhesive substantially covers each ear pad.

9. The set of pads of claim 1, wherein each ear pad has a length defined between said ends of said ear pad, each ear pad has a width being defined between said sides of said of said ear pad, each ear pad has a thickness defined between said first and second surfaces of said ear pad, wherein said length of each ear pad is greater than about 3/8 inch, wherein said width of each ear pad is greater than about 1/4 inch, and wherein said thickness of each ear pad is greater than about 1/32 inch.

10. The set of pads of claim 9, wherein said length of each ear pad is greater than about 3/4 inch, wherein said width of each ear pad is greater than about 1/2 inch, and wherein said thickness of each ear pad is greater than about 1/16 inch.

11. A set of pads for attachment to a pair of eyeglasses having a front frame for holding pair of lenses, a bridge, and a pair of temples extending from the front frame, the front frame having a pair of nose tabs for resting on a nose of a wearer, the nose tabs being located adjacent the bridge, each of the temples having an end piece for resting on and looping behind the ears of a wearer, said set of pads comprising:

a pair of nose pads adapted for attaching to the nose tabs of a pair of eyeglasses;

each nose pad being generally oblong and having a first and second surfaces, a pair of ends and a pair of sides extending between said ends of said nose pad;

wherein said sides of each nose pad converge towards one another in a direction towards one of said ends of said nose pad;

wherein said ends and sides of each nose pad are rounded towards said first surface of said nose pad;

each nose pad having a plurality of corners, a corner being formed at each intersection of a end and a side of a nose pad, said corners being rounded;

each nose pad having a length defined between said ends of said nose pad, each nose pad having a width being defined between said sides of said of said nose pad, each nose pad having a thickness defined between said first and second surfaces of said nose pad;

wherein said length of each nose pad is greater than about 3/4 inch, wherein said width of each nose pad is greater than about 5/8 inch, wherein said thickness of each nose pad is greater than about 1/16 inch;

an adhesive being provided on said first and second surfaces of each nose pad, wherein said adhesive substantially covers each nose pad, said adhesive on said second surface being for adhesively attaching said second surface to a nose tab of a pair of glasses;

a pair of ear pads adapted for attaching to the end pieces of the temples of the frame of a pair of eyeglasses;

each ear pad being generally rectangular and having a first and second surfaces, a pair of ends and a pair of sides extending between said ends of said ear pad;

wherein said ends and sides of each ear pad are rounded towards said first surface of said ear pad;

each ear pad having a plurality of corners, a corner being formed at each intersection of a end and a side of a ear pad, said corners being rounded;

each ear pad having a length defined between said ends of said ear pad, each ear pad having a width being defined between said sides of said of said ear pad, each ear pad having a thickness defined between said first and second surfaces of said ear pad;

wherein said length of each ear pad is greater than about 3/4 inch, wherein said width of each ear pad is greater than about 1/2 inch, wherein said thickness of each ear pad is greater than about 1/16 inch; and an adhesive being provided on said first and second surfaces of each ear pad, wherein said adhesive substantially covers each ear pad, said adhesive on said second surface being for adhesively attaching said second surface to an end piece of a temple of a frame of a pair of glasses.

* * * * *